(12) United States Patent
Czap, Jr. et al.

(10) Patent No.: US 7,788,389 B2
(45) Date of Patent: *Aug. 31, 2010

(54) PROGRAM STORAGE DEVICE FOR STORAGE-AWARE FLOW RESOURCE

(75) Inventors: Joseph C. Czap, Jr., Cary, NC (US); Prasenjit Sakar, San Jose, CA (US); Sandeep Madhav Uttamchandani, San Jose, CA (US); Kaladhar Voruganti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 27 days.

This patent is subject to a terminal disclaimer.

(21) Appl. No.: 12/134,264

(22) Filed: Jun. 6, 2008

(65) Prior Publication Data

US 2008/0244073 A1 Oct. 2, 2008

Related U.S. Application Data

(63) Continuation of application No. 10/313,747, filed on Dec. 6, 2002, now Pat. No. 7,421,502.

(51) Int. Cl.
G06F 15/16 (2006.01)
(52) U.S. Cl. .................. 709/229; 709/217; 709/226
(58) Field of Classification Search .......... 709/226, 709/229, 235; 718/105; 711/100
See application file for complete search history.

(56) References Cited

U.S. PATENT DOCUMENTS

| | | | |
|---|---|---|---|
| 5,130,986 A | 7/1992 | Doshi et al. | |
| 5,204,954 A | 4/1993 | Hammer et al. | |
| 5,412,780 A | 5/1995 | Rushton | |
| 5,463,776 A | 10/1995 | Voigt et al. | |
| 5,640,530 A | 6/1997 | Beardsley et al. | |
| 5,706,467 A | 1/1998 | Vishlitzky et al. | |
| 5,719,854 A * | 2/1998 | Choudhury et al. | 370/231 |
| 5,802,310 A | 9/1998 | Rajaraman | |
| 5,815,660 A * | 9/1998 | Momona | 709/208 |
| 5,872,997 A | 2/1999 | Golson | |
| 5,933,603 A | 8/1999 | Vahalia et al. | |
| 5,951,658 A * | 9/1999 | Daray et al. | 710/56 |
| 5,996,013 A | 11/1999 | Delp et al. | |
| 6,034,945 A | 3/2000 | Hughes et al. | |
| 6,084,856 A | 7/2000 | Simmons et al. | |
| 6,192,029 B1 * | 2/2001 | Averbuch et al. | 370/229 |
| 6,249,530 B1 * | 6/2001 | Blanco et al. | 370/468 |

(Continued)

FOREIGN PATENT DOCUMENTS

JP  2006333434 A  * 12/2006

Primary Examiner—Benjamin R Bruckart
Assistant Examiner—Alicia Baturay
(74) Attorney, Agent, or Firm—Gibb I.P. Law Firm, LLC

(57) ABSTRACT

A program storage device for managing resources in a storage system that is based on server resource usage is disclosed. The program storage device performs a method that allocates a command window to each of the servers accessing the resources, achieves an equilibrium state that balances the size of each server's command window and the amount of free resources, and maintains the equilibrium state by continually adjusting the size of each command window. The command window defines a limit on the number of outstanding storage requests that each server may maintain. The invention initially allocates a minimum sized command window.

8 Claims, 2 Drawing Sheets

U.S. PATENT DOCUMENTS

| | | | |
|---|---|---|---|
| 6,292,834 B1* | 9/2001 | Ravi et al. | 709/233 |
| 6,370,114 B1 | 4/2002 | Gullicksen et al. | |
| 6,374,336 B1 | 4/2002 | Peters et al. | |
| 6,385,673 B1* | 5/2002 | DeMoney | 710/60 |
| 6,446,144 B1* | 9/2002 | Habusha et al. | 710/29 |
| 6,477,590 B1* | 11/2002 | Habusha et al. | 710/29 |
| 6,601,143 B1* | 7/2003 | Lamparter | 711/134 |
| 6,721,789 B1* | 4/2004 | DeMoney | 709/219 |
| 6,839,815 B2 | 1/2005 | Kagami et al. | |
| 6,895,585 B2* | 5/2005 | Smith | 718/103 |
| 6,898,664 B2* | 5/2005 | Matthews et al. | 711/112 |
| 6,904,596 B1* | 6/2005 | Clark et al. | 719/310 |
| 6,909,691 B1* | 6/2005 | Goyal et al. | 370/230 |
| 6,990,071 B2* | 1/2006 | Adam et al. | 370/230 |
| 7,031,928 B1* | 4/2006 | Cochran | 705/7 |
| 7,047,312 B1* | 5/2006 | Aweya et al. | 709/235 |
| 7,158,479 B1* | 1/2007 | Noble | 370/229 |
| 7,307,989 B2* | 12/2007 | Ofek et al. | 370/389 |
| 7,421,502 B2* | 9/2008 | Czap et al. | 709/229 |
| 2003/0074674 A1* | 4/2003 | Magliaro | 725/118 |
| 2003/0079018 A1* | 4/2003 | Lolayekar et al. | 709/226 |
| 2003/0086371 A1* | 5/2003 | Walton et al. | 370/235 |
| 2003/0163734 A1* | 8/2003 | Yoshimura et al. | 713/201 |
| 2003/0219037 A1* | 11/2003 | Toskala et al. | 370/496 |
| 2004/0015968 A1* | 1/2004 | Neiman et al. | 718/100 |
| 2004/0025162 A1* | 2/2004 | Fisk | 718/105 |
| 2004/0139434 A1* | 7/2004 | Blythe et al. | 718/100 |
| 2005/0038890 A1* | 2/2005 | Masuda et al. | 709/224 |
| 2005/0102398 A1* | 5/2005 | Zhang et al. | 709/225 |

* cited by examiner

PROGRAM STORAGE DEVICE FOR STORAGE-AWARE FLOW RESOURCE

CROSS-REFERENCE TO RELATED APPLICATIONS

This application is a continuation of U.S. patent application Ser. No. 10/313,747, filed Dec. 6, 2002.

BACKGROUND OF THE INVENTION

1. Field of the Invention

The present invention generally relates to computer data storage systems and more particularly to a system that manages resources in a storage system being accessed by servers based on server resource usage.

2. Description of the Related Art

The evolution of storage area networks has led to the flow of data between host servers and storage subsystems. This flow of data is facilitated by transport protocols that provide reliability and in-order guarantees. In addition, these transport protocols provide flow resource management at the transport level so that receivers and senders do not overflow buffers.

However, conventional flow resource management within the transport layer does not maintain a knowledge base of storage semantics, which may lead to sub-optimal performance. For example, consider a storage subsystem that is providing services to many host servers. The transport module in the storage subsystem may divide up its resources between the host servers strictly based on transport metric such as flow rate. However, this may not be efficient, as the transport module does not interpret the storage semantics of the data exchange between the storage subsystem and the host servers.

For example, assume an initiator has a transport window size of 5000 bytes, and sends a 20 byte read request for 16 MB. The target accepts the request but cannot handle any more requests. However, the transport is oblivious to this and the sender has a window size of 4980 bytes, thus allowing the initiator to send more requests.

| Storage | Transport |
|---|---|
| One-to-many | One-to-one |
| Exact | Inexact |
| Multiple resources | Single resources |
| Application-aware | Network-aware |

The table above shows how the problem domain of storage and transport flow resource management is different. First, the storage resource management problem addresses the wider domain of resource management between many storage host server clients and a storage subsystem serving these clients. By contrast, the transport flow resource management is concerned with just two networking peers. Second, the storage flow resource management has an exact notion of the various types of resources under its control. On the other hand, the transport flow resource management does not attempt to quantify the resource utilization in the network and treats it as one indivisible type. Finally, the storage flow resource management is application-aware as it is closer to the application stack whereas the network flow resource management is more network-aware.

This amplifies the need for an integrated flow resource management approach for storage area networks. The invention described below presents a system and method for storage-aware flow resource management that maximizes resource utilization in a storage area network.

SUMMARY OF THE INVENTION

The invention provides a method for managing resources in a storage system that is based on server resource usage. The method allocates a command window to each of the servers accessing the resources, achieves an equilibrium state that balances the size of each server's command window and the amount of free resources, and maintains the equilibrium state by continually adjusting the size of each command window. The command window defines a limit on the number of outstanding storage requests that each server may maintain. The invention initially allocates a minimum sized command window.

The invention achieves the equilibrium state by operating in an equilibrium achievement mode. While operating in the equilibrium achievement mode, the invention increases the size of each server's command window at a high rate (an exponential rate) as each of the servers completes a successful storage operation.

The invention maintains the equilibrium state by changing to a equilibrium maintenance mode when a storage request is unsuccessful (e.g., a retry, busy, etc.). While operating in the equilibrium maintenance mode, the invention first decreases the size of each command window by a reduction factor and then increases the size of each server's command window at a lower rate less than the rate used in the equilibrium achievement mode as each of the servers completes a successful storage operation. This lower rate is inversely proportional to the size of each command window. The invention reverts to the equilibrium achievement mode when the level of free resources rises above an upper limit and this cycle repeats.

In addition, the invention stops all increasing processes when the amount of free resources falls below a lower limit and restarts such increasing processes when the amount of the free resources rises above the lower limit. Further, the invention stops the increasing processes for a specific server when that server stops utilizing the resources and restarts such increasing processes when the server again begins utilizing the resources.

The invention minimizes oscillations between equilibrium regions and maximizes the rate at which the system converges to the equilibrium region. Thus, the invention provides predictable performance for applications.

BRIEF DESCRIPTION OF THE DRAWINGS

The invention will be better understood from the following detailed description of preferred embodiments of the invention with reference to the drawings, in which.

DETAILED DESCRIPTION OF PREFERRED EMBODIMENTS OF THE INVENTION

As mentioned above, there is a need for an integrated flow resource management approach for storage area networks. The invention described below presents such a system and method for storage-aware flow resource management that maximizes resource utilization in a storage area network. The invention provides an integrated approach to flow resource management at the storage subsystem and uses the resource indicators in the storage subsystem to provide primary input for flow resource management decisions. The invention fairly distributes storage resources among all host servers accessing the storage subsystem. By avoiding under-utilization of storage resources, the host servers can extract the maximum performance out of the storage subsystem.

Figure 1:
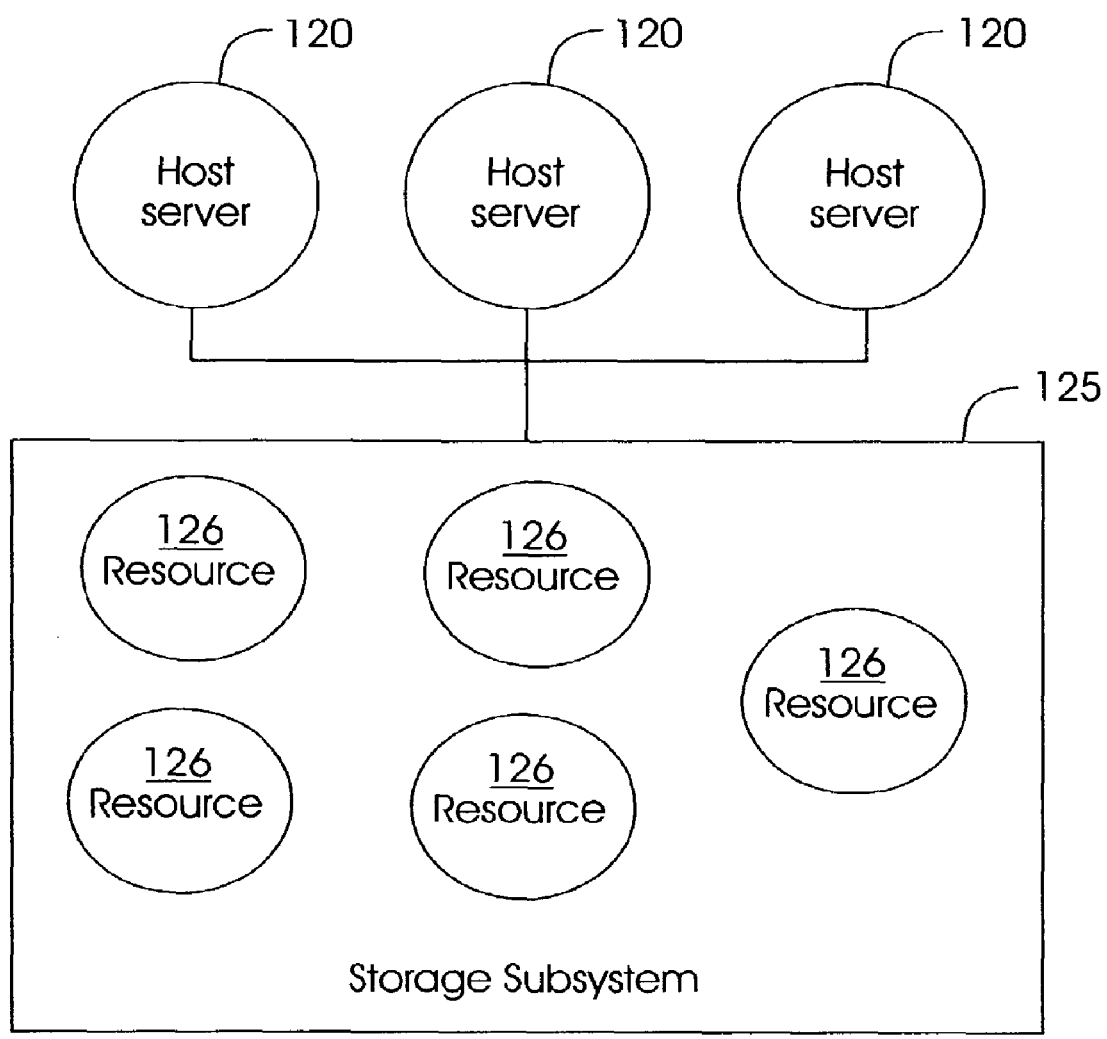
FIG. 1 is a schematic diagram of a storage system.

The mechanism by which resources 126 are allocated by the storage subsystem 125 to host servers 120 is by using a command window (FIG. 1). This command window specifies the limit on the number of outstanding storage requests present at the host server. The storage subsystem is able to throttle a client (server 120) by reducing the size of the command window; the reverse is possible by increasing the size of the command windows. The command window is communicated to the clients of the storage subsystem by embedding the value in response headers.

The resources in the storage subsystem are monitored whenever a command arrives at the storage subsystem. The number and type of resources to be monitored varies from one storage subsystem to another. However, the only input to the flow resource management algorithm is that the storage subsystem has a resource deficit.

For example, assume that there are N host servers accessing the storage subsystem with R resource units. At any given time instance t, there is an N-dimensional resource allocation region which satisfies all host servers at time t without the need for command retransmissions or timeouts. This region is referred to in the subsequent description as an equilibrium region. The equilibrium region is dynamic and changes over time.

Figure 2:
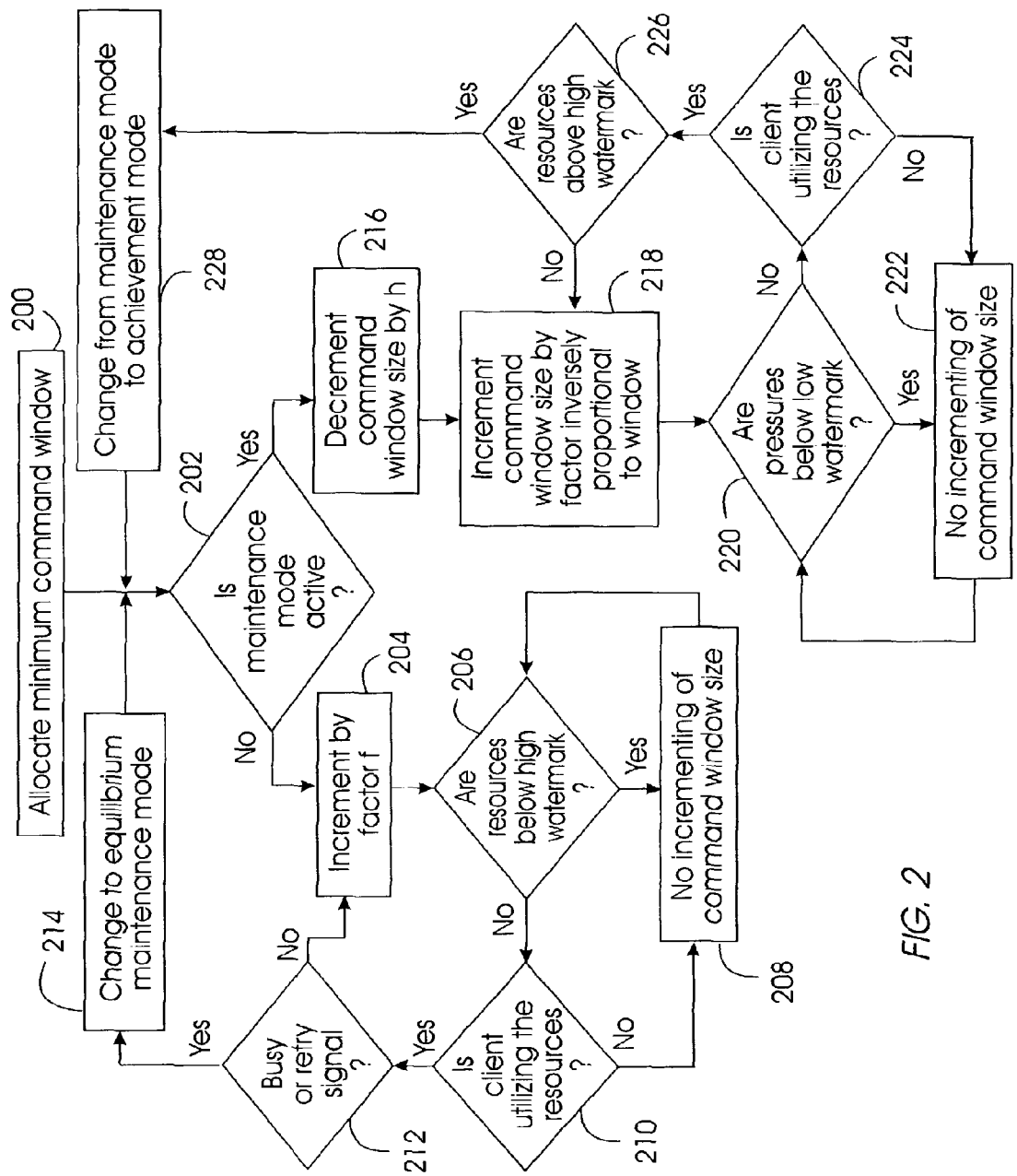
FIG. 2 is a flow diagram illustrating a preferred method of the invention.

The processing achieved by the invention is shown in FIG. 2. When a host server opens a transport connection to the storage subsystem, the host server is allocated a minimal command window of m 200. The value of m is decided by the storage subsystem and is dependent on the minimal amount of resources that can be guaranteed to any host server. For example, the upper bound of m could be floor (R/N).

The invention first quickly achieves an equilibrium state that balances the size of each server's command window and the amount of free resources, and then maintains the equilibrium state by continually adjusting the size of each command window. This is accomplished by operating in two different modes, the equilibrium achievement mode and the equilibrium maintenance mode. Initially, the invention is in the equilibrium achievement mode. Therefore, in decision block 202 processing would proceed initially to block 204.

In item 204, for every command that comes into the storage subsystem from a host server that is successful in obtaining the relevant resources necessary for the command, the command window specific to the host server is incremented by a factor f by the storage subsystem. This factor is designed to quickly increase window sizes and quickly achieve an equilibrium condition. For example, if the factor f has the value 1, it has the effect of doubling the command window over time for bursty traffic that has not reached peak throughput; otherwise the rate of increase is linear (typical of steady traffic flows). The value of f is determined by how aggressive the storage subsystem wants to be in increasing the window size and reaching the equilibrium region. However, it is noted that too aggressive a value of f may upset the equilibrium leading to oscillations, while a very conservative value of f may be detrimental for the performance of the host server. For example, empirical results from observations made in systems indicate that a value of 1 is sufficient for a quick approach to the equilibrium region and that larger values of f tend to cause frequent oscillations in and out of the equilibrium region.

Next, in the loop of items 206 and 208, the storage subsystem prevents the window size oscillations. This helps the storage subsystem provide more determinism in performance guarantees inside the equilibrium region. To that effect, whenever the amount of free resources is judged to be below a low watermark in item 206, processing proceeds to item 208 and the command window is not incremented. Block 208 loops back to the processing in item 206 to see if additional free resources have come available and, if they have, processing loops back to item 204 through items 210 and 212. While it is possible to allow the size of the command windows to increase until all the resources are completely exhausted and then throttle back the host servers, the use of a low watermark for buffer space reduces the amount of oscillation for the command window size. The low watermark is chosen appropriately to reduce the equilibrium region oscillations to an appropriate level. A conservative value of 15-20% is considered an appropriate value for the low watermark in most systems.

The window-size of the client will stop increasing when the client is not utilizing the resources that are allocated for it or the usage drops below a predetermined minimum threshold (u). This is achieved in decision block 210 which directs the processing flow to item 208 to prevent window size increments when the client does not utilize the resources which it has been allocated. The processing flow will continue to prevent window size increases by looping through items 208, 206 and 210 so long as this condition remains. This allows the invention to increase the size of the equilibrium region and avoid oscillations to a new equilibrium region when the load on the storage subsystem increases rapidly. That is, if the actual usage (outstanding commands/window size) of the client window size goes below a threshold u, the target stops further increases in window size until the usage goes above the threshold u. For example, if the client has a stable workload it may require a command-window size of 16. If the low threshold is 0.5, the window-size will not grow past 32, unless there is an increase in utilization by the client. The value of u is decided on the basis of how much extra resources are there is in the system to handle additional bursty traffic.

As the various window sizes increase and more resources are allocated, it is likely that an incoming command from a host server will be unable to obtain any allocation of resources. In such an unsuccessful storage operation, the storage subsystem provides a 'retry' or 'busy' or an equivalent response back to the host server. At this point, the equilibrium condition has been achieved (and passed) and the system needs to return to the equilibrium state. Therefore, at this point, the invention goes into an equilibrium maintenance (cautionary) mode. In the equilibrium maintenance mode, the invention reduces the size of all windows and reduces the rate at which windows are allowed to grow. Thus, as shown in item 212, when an unsuccessful storage operation occurs (retry or busy) processing proceeds to item 214 where the equilibrium maintenance mode is established. Then decision block 202 directs processing to item 216 where the sizes of all command windows are reduced.

More specifically, the storage subsystem divides the command window size of the storage server by h. Therefore, if h is 2, all command window sizes are reduced in half, if h is 3, all command window sizes are reduced to one-third of their previous size. The breadth of the search for system equilibrium determines the factor h. For example, if h is too small, then the system may not find the equilibrium region leading to more oscillations. If h is too large, the search may take too long to find the equilibrium region. For example, a value of 2 for h is sufficient enough to avoid oscillations in the search for the equilibrium region.

Next, processing proceeds to item 218 where the invention increments the command window by a factor inversely proportional to the size of the command window. In other words, the command window is incremented by a factor=j/command window size; where j again is determined by how aggressively the storage subsystem wants to approach the equilibrium region. For example, most systems use a value of 1 for j, as higher values do not seem to have any effect on the search for the equilibrium region.

The processing loops created by items 220, 222, 224 are similar in operation to items 206, 208, and 210, discussed above, and prevent the window sizes from being incremented when resources are below the low watermark or when the server is not utilizing the allocated resources. Reference is made to the previous description for these elements.

Once the storage subsystem has gone into the equilibrium maintenance mode, the storage subsystem goes back into the equilibrium achievement mode only when the number of free resources reaches a high watermark. The high watermark is also chosen such that there are no frequent oscillations between the equilibrium maintenance and achievement modes. This is shown in item 226 which directs processing to item 228 if the number of free resources reaches the high watermark (e.g., goes above a predetermined upper limit). Item 228 changes back to the equilibrium achievement mode and directs processing to item 202 which will repeat the processing described above.

Some benefits of the invention include that the method and system presents a storage aware flow resource management system that optimizes storage performance in contrast to conventional network-centric flow resource management schemes that have limited scope. The inventive method and system provide a mechanism that uses an exponential window increase to reach the equilibrium region for a given storage subsystem in the fastest time possible. Once this equilibrium condition is reached, the invention changes to a maintenance mode and reduces the sizes of changes made to the command windows. The method and system minimizes oscillations between equilibrium regions as clients of the storage subsystem vary their rates of access. This is done by reducing the window size by a factor h in the face of resource congestion to increase the breadth of search for the equilibrium region, increasing the window size cautiously in congestion (maintenance) mode so as not to fail in the search for the new equilibrium region. Further, the invention introducing the concepts of a low watermark to introduce further stability to the equilibrium region and of using window usage to stop window size growth and increase the size of the equilibrium region. The method and system described herein provide window increase mechanisms that are suited for both bursty traffic as well as steady traffic flows.

While the invention has been described in terms of preferred embodiments, those skilled in the art will recognize that the invention can be practiced with modification within the spirit and scope of the appended claims.

For example, other application areas that can benefit from this invention are application services or any general category of software services where there are multiple entities competing for a fixed set of resources via a general form of interconnect.

What is claimed is:

1. A program storage device readable by machine, embodying a program of instructions executable by the machine to perform a method for managing resources in a storage system being accessed by servers, said method comprising:

allocating a command window to each of said servers accessing said resources, wherein said command window defines a limit on the number of outstanding storage requests that each server may maintain against said resources;

initially operating in an equilibrium achievement mode that balances the size of each server's command window and the amount of free resources available in said resources, wherein, while operating in said equilibrium achievement mode, said method comprises increasing the size of each server's command window at a first rate as each of said servers completes a successful storage operation;

changing to an equilibrium maintenance mode that balances the size of each server's command window and the amount of free resources available in said resources when a storage request is unsuccessful, wherein, while operating in said equilibrium maintenance mode, said method comprises:

decreasing the size of each command window by a reduction factor; and increasing the size of each server's command window at a second rate less than said first rate as each of said servers completes a successful storage operation;

reverting to said equilibrium achievement mode when the level of free resources rises above an upper limit; and repeating said changing and reverting processes;

wherein said repeating process acquires and maintains an equilibrium balance between the size of each command window and the amount of free resources.

2. The method according to claim 1, wherein said method further comprises allocating initially allocates a minimum sized command window.

3. The method according to claim 1, further comprising:

stopping said increasing processes when the amount of free resources falls below a lower limit;

restarting said increasing processes when the amount of said free resources rises above said lower limit; and repeating said stopping and said restarting processes.

4. The method according to claim 1, further comprising:

stopping said increasing processes for a server when said server stops utilizing said resources;

restarting said increasing processes when said server again begins utilizing said resources; and repeating said stopping and said restarting processes.

5. The method according to claim 1, wherein a smaller command window comprises a smaller limit on said number of outstanding storage requests when compared to a larger command window that comprises a relatively larger limit on said number of outstanding storage requests.

6. The method according to claim 1, wherein a smaller command window comprises a smaller limit on said number of outstanding storage requests when compared to a larger command window that comprises a relatively larger limit on said number of outstanding storage requests.

7. The method according to claim 1, wherein said increasing of said size of said each command window comprises increasing said limit on said number of outstanding storage requests.

8. The method according to claim 1, wherein said increasing of said size of said each server's command window comprises increasing said limit on said number of outstanding storage requests.

* * * * *